United States Patent
Hoxworth

(10) Patent No.: US 12,106,282 B2
(45) Date of Patent: Oct. 1, 2024

(54) UNIVERSAL CARD READER AND MOBILE DEVICE HOLDER

(71) Applicant: Path Point Merchant Services, LLC, American Fork, UT (US)

(72) Inventor: Damon John Hoxworth, Moorpark, CA (US)

(73) Assignee: Path Point Merchant Services, LLC, American Fork, UT (US)

( * ) Notice: Subject to any disclaimer, the term of this patent is extended or adjusted under 35 U.S.C. 154(b) by 270 days.

(21) Appl. No.: 17/518,368

(22) Filed: Nov. 3, 2021

(65) Prior Publication Data

US 2023/0138569 A1     May 4, 2023

(51) Int. Cl.
| | |
|---|---|
| *G06Q 20/32* | (2012.01) |
| *G06F 1/16* | (2006.01) |
| *G06Q 20/20* | (2012.01) |
| *G06Q 20/34* | (2012.01) |

(52) U.S. Cl.
CPC ......... *G06Q 20/322* (2013.01); *G06F 1/1632* (2013.01); *G06Q 20/204* (2013.01); *G06Q 20/353* (2013.01)

(58) Field of Classification Search
CPC .. G06Q 20/322; G06Q 20/204; G06Q 20/353; G06F 1/1632
See application file for complete search history.

(56) References Cited

U.S. PATENT DOCUMENTS

2021/0129768 A1*   5/2021   Leimer ............... B60R 11/0241

FOREIGN PATENT DOCUMENTS

WO    WO-2021115224 A1 *   6/2021         B60R 11/0241

OTHER PUBLICATIONS https://www.pgytech.com/products/pgytech-osmo-pocket-phone-holder ("Osmo") (Year: 2020).*
https://www.magtek.com/product/idynamo-6 ("iDynamo") (Year: 2020).*

* cited by examiner

*Primary Examiner* — A. Hunter Wilder
*Assistant Examiner* — Joseph M Mutschler
(74) *Attorney, Agent, or Firm* — Kirton McConkie; Brian Tucker

(57) ABSTRACT

A universal card reader and mobile device holder may be configured to house a card reader and to selectively secure a mobile device such as a smart phone adjacent to the card reader. Accordingly, the universal card reader and mobile device holder can enable a user to easily interact with the card reader and the mobile device as part of a mobile point-of-sale system.

20 Claims, 9 Drawing Sheets

UNIVERSAL CARD READER AND MOBILE DEVICE HOLDER

CROSS-REFERENCE TO RELATED APPLICATIONS

N/A

BACKGROUND

Various card readers have been developed to enable mobile devices such as smart phones to be used as a mobile point-of-sale system (mPOS). These card readers may be configured to connect to a mobile device via a wired interface (e.g., via a smart phone's audio jack, USB port, etc.) or via a wireless interface (e.g., via Bluetooth or Wi-Fi).

BRIEF SUMMARY

The present invention extends to a universal card reader and mobile device holder (or "universal holder"). A universal holder may be configured to house a card reader and to selectively secure a mobile device such as a smart phone adjacent to the card reader. Accordingly, the universal holder can enable a user to easily interact with the card reader and the mobile device as part of a mobile point-of-sale system.

In first example embodiments, the present invention may be implemented as a universal card reader and mobile device holder that includes a card reader holding component that is configured to hold a card reader, a mobile device holding component that is configured to move relative to the card reader holding component to accommodate a variety of mobile devices, and an actuator mechanism that is configured to move the mobile device holding component relative to the card reader holding component and lock a position of the mobile device holding component relative to the card reader holding component.

In the first example embodiments, the card reader holding component may include a card reader compartment and a lower compartment, and the mobile device holding component may move within the lower compartment.

In the first example embodiments, the mobile device holding component may include a support and an extension, and the extension may insert into the lower compartment.

In the first example embodiments, the extension may include a channel, and the actuator mechanism may insert into the channel.

In the first example embodiments, the channel may form a rack and the actuator mechanism may form a pinion.

In the first example embodiments, the actuator mechanism may comprise an upper wheel that forms the pinion and a lower wheel.

In the first example embodiments, the lower wheel may interface with the upper wheel to lock the position of the mobile device holding component relative to the card reader holding component.

In the first example embodiments, the upper wheel and lower wheel may include radial ridges that interlock.

In the first example embodiments, the lower wheel may tighten against the upper wheel to lock the position of the mobile device holding component relative to the card reader holding component.

In the first example embodiments, the card reader holding component may include one or more tabs that extend over one end of a mobile device and the card reader holding component may include one or more tabs that extend over an opposite end of the mobile device.

In the first example embodiments, the card reader holding component may include a lower compartment into which the mobile device holding component inserts, and the one or more tabs of the card reader holding component may be positioned above the lower compartment.

In the first example embodiments, the mobile device holding component may comprise a rack and the actuator mechanism may comprise a pinion.

In second example embodiments, the present invention may be implemented as a universal card reader and mobile device holder that includes a card reader holding component having a card reader compartment and a lower compartment, a mobile device holding component having a support and an extension that inserts into the lower compartment, and an actuator mechanism that inserts into the lower compartment and interfaces with the extension to cause the mobile device holding component to slide relative to the card reader holding component.

In the second example embodiments, the extension may form a channel and the actuator mechanism may insert into the channel.

In the second example embodiments, the channel may form a rack and the actuator mechanism may form a pinion.

In the second example embodiments, the actuator mechanism may comprise an upper wheel that forms the pinion, and the actuator mechanism may further comprise a lower wheel that interlocks with the upper wheel to retain a position of the mobile device holding component.

In third example embodiments, the present invention may be implemented as a universal card reader and mobile device holder that includes a card reader holding component having a card reader compartment and a lower compartment. The universal card reader and mobile device holder may also include a mobile device holding component having a support and an extension. The extension includes a channel forming a first gear. The extension also inserts into the lower compartment. The universal card reader and mobile device holder may further include an actuator mechanism having an upper wheel that forms a second gear that inserts into the lower compartment and through the channel. The first and second gears interface to cause the mobile device holding component to move relative to the card reader holding component.

In the third example embodiments, the actuator mechanism may comprise a lower wheel that interlocks with the upper wheel to retain a position of the mobile device holding component to move relative to the card reader holding component.

In the third example embodiments, the lower wheel may tighten against the upper wheel to interlock with the upper wheel.

In the third example embodiments, the mobile device holding component may include one or more tabs for securing one end of a mobile device, and the card reader holding component may include one or more tabs for securing an opposite end of the mobile device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

A universal card reader and mobile device holder configured in accordance with one or more embodiments of the present invention may be used to create a mobile point-of-sale system from a variety of card readers and mobile devices. FIGS. 1A-5D provide an example where a universal card reader and mobile device holder 10 (or "universal holder 10") is configured for use with a BBPOS Chipper 2X BT card reader. As described below, universal reader 10 can be easily adapted for use with other types of card readers.

Figure 1A:
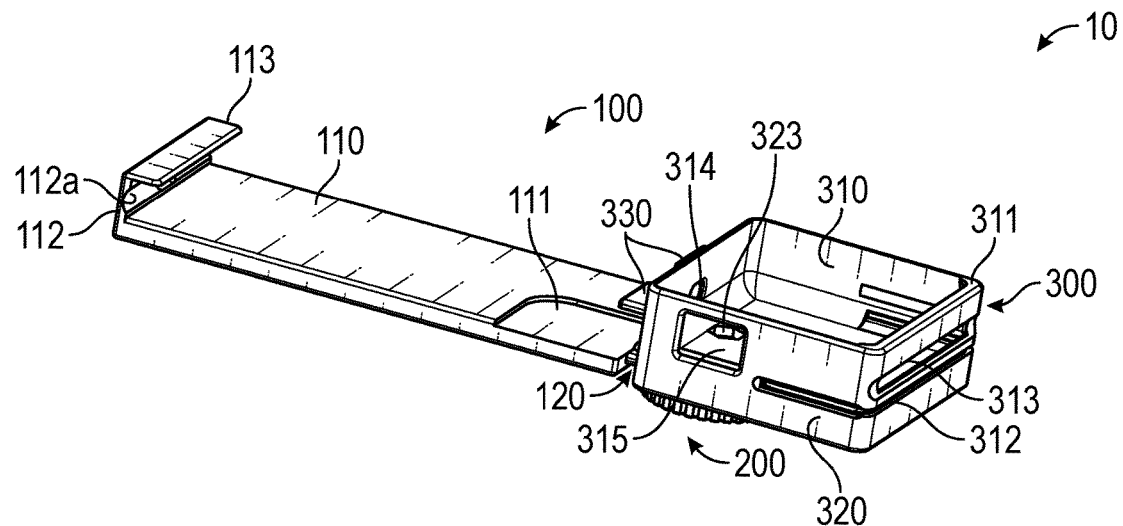
FIGS. 1A and 1B are assembled and exploded views respectively of a universal card reader and mobile device holder that is configured in accordance with one or more embodiments of the present invention.
Figure 1B:
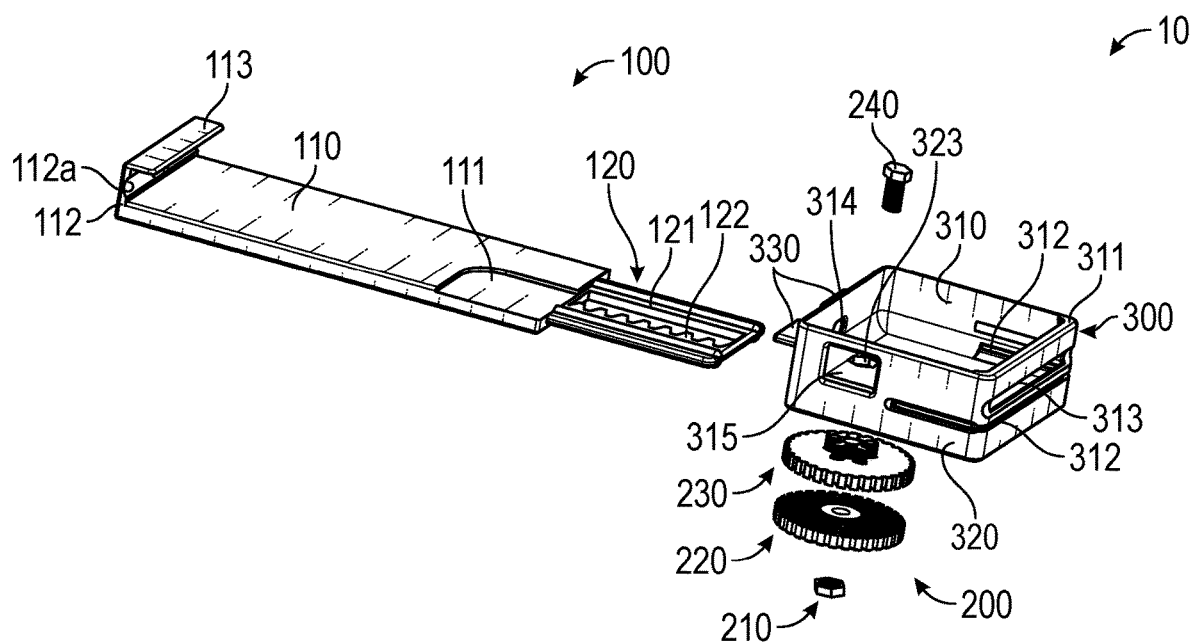
Figure 2:
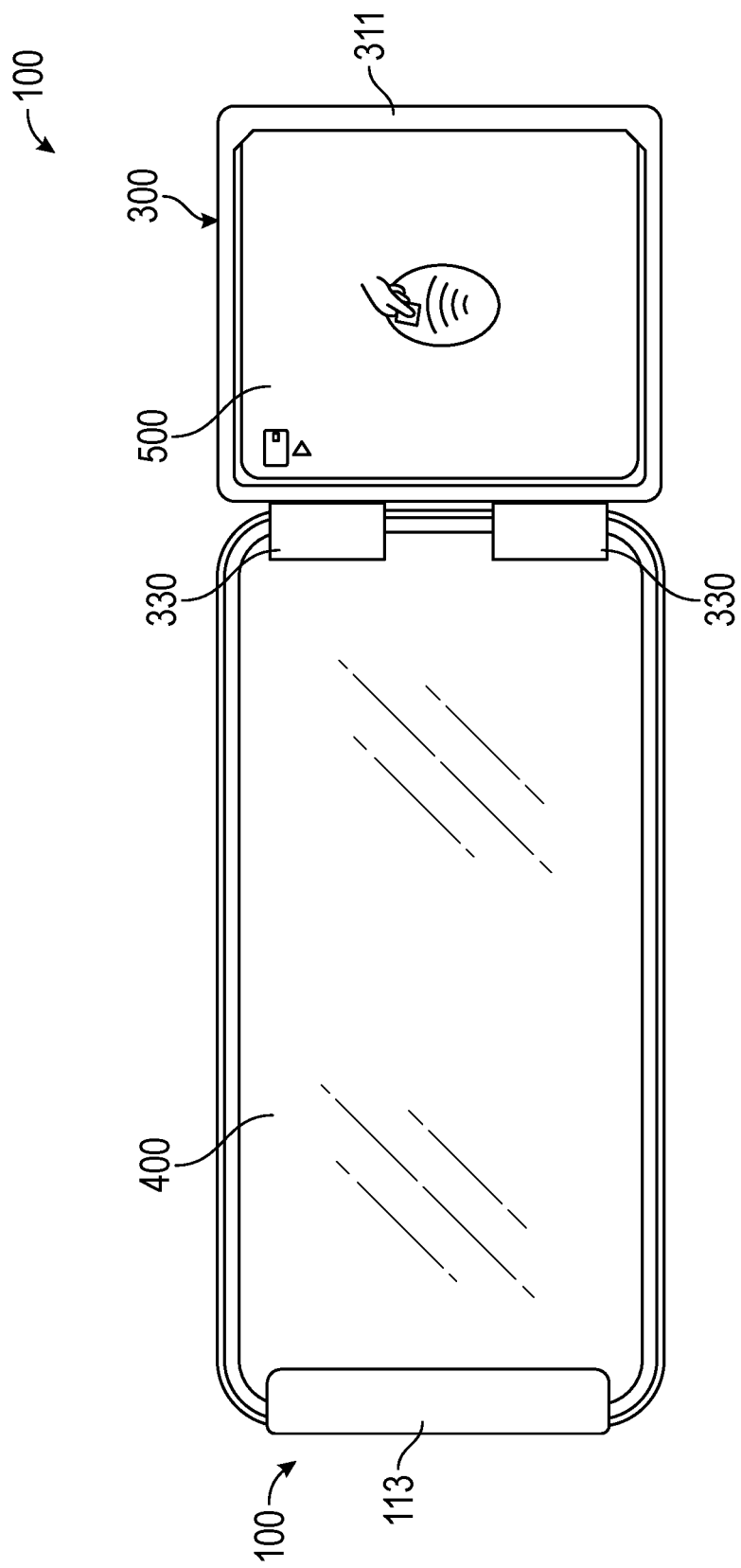
FIG. 2 is a front view of the universal card reader and mobile device holder of FIGS. 1A and 1B showing how a card reader and a mobile device may be held adjacent one another.
Figure 3A:
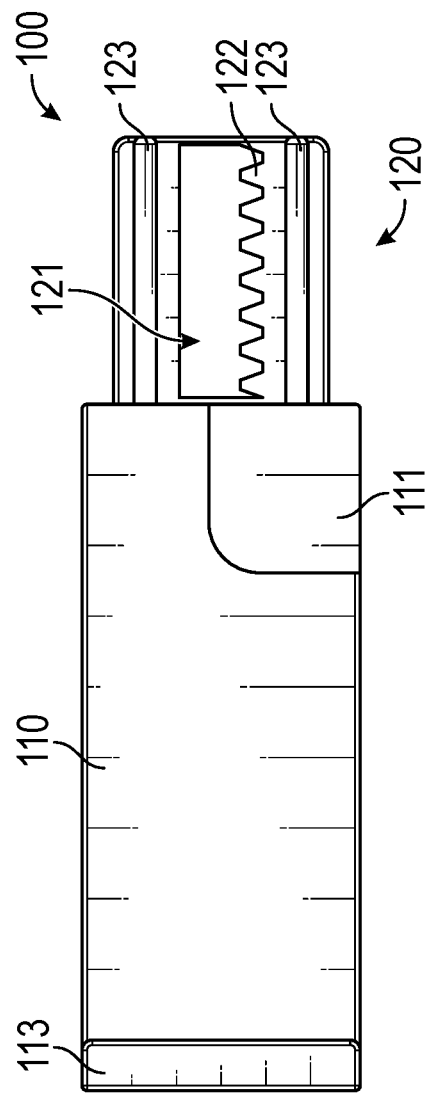
FIGS. 3A-3C are front, side and bottom views respectively of a mobile device holding component of the universal card reader and mobile device holder of FIGS. 1A and 1B.
Figure 3C:
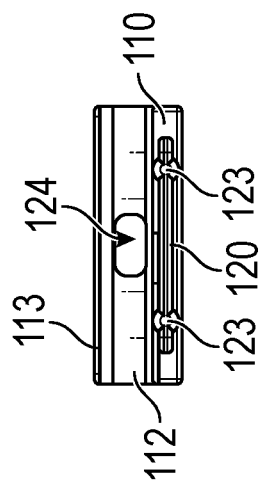
Figure 3B:
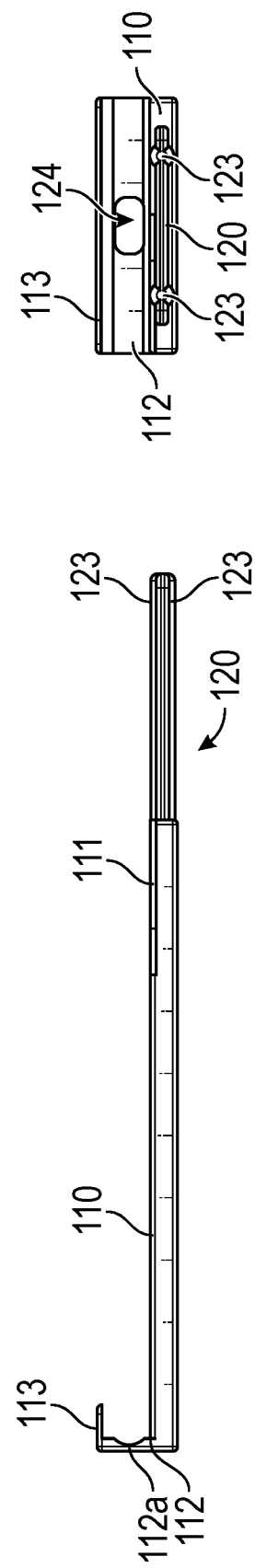
Figure 4A:
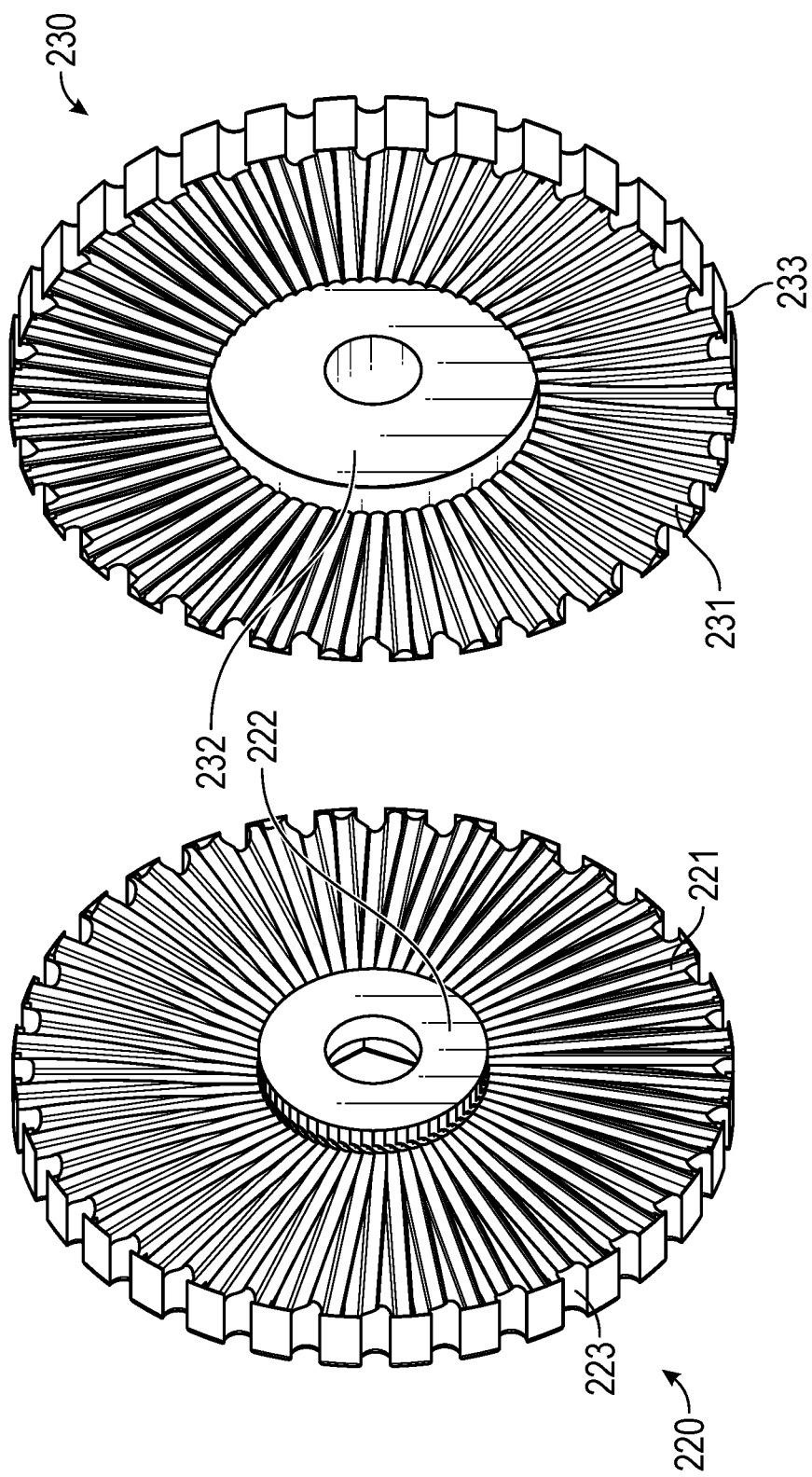
FIGS. 4A and 4B are views of an actuator mechanism of the universal card reader and mobile device holder of FIGS. 1A and 1B.
Figure 4B:
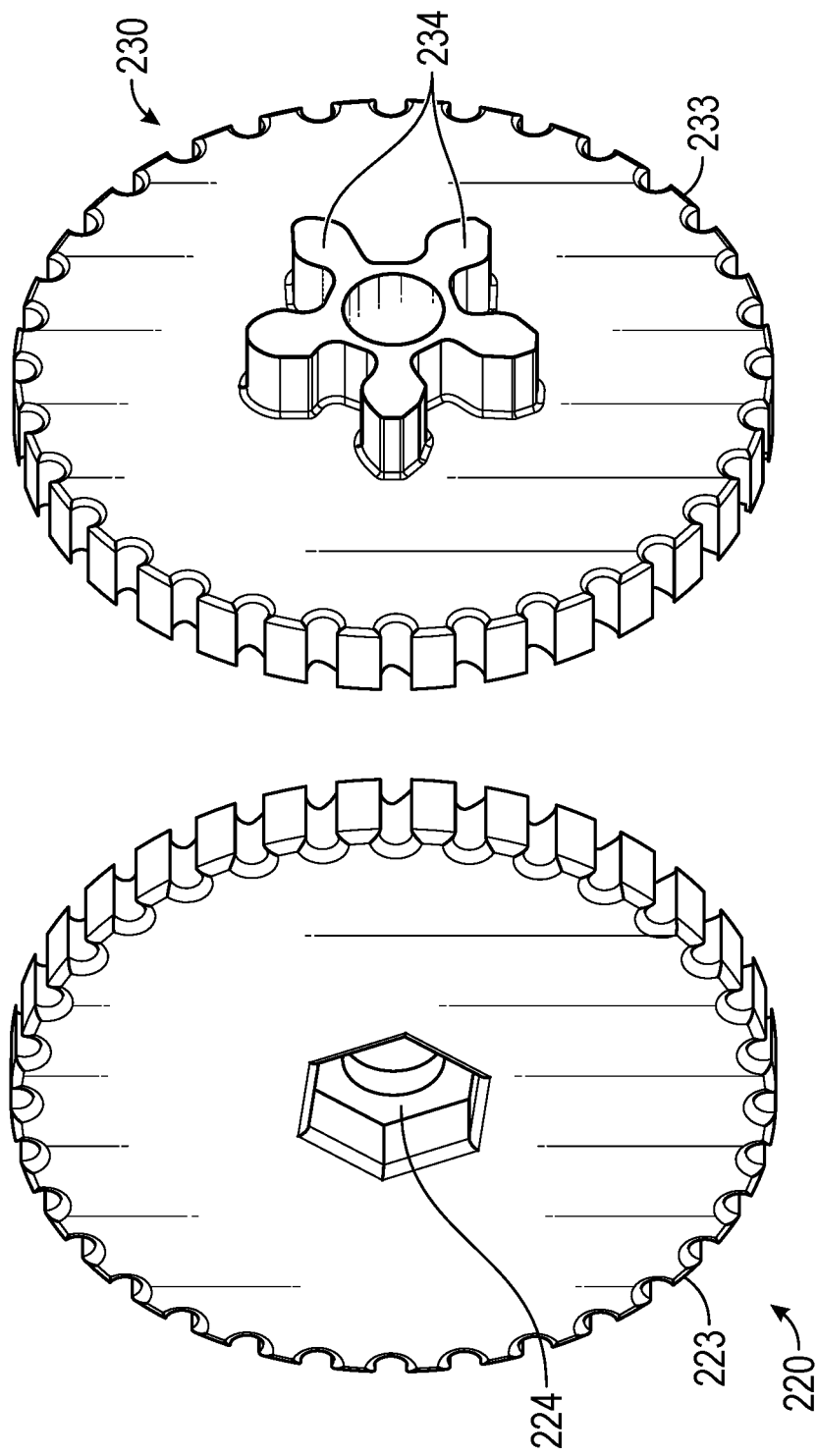
Figure 5A:
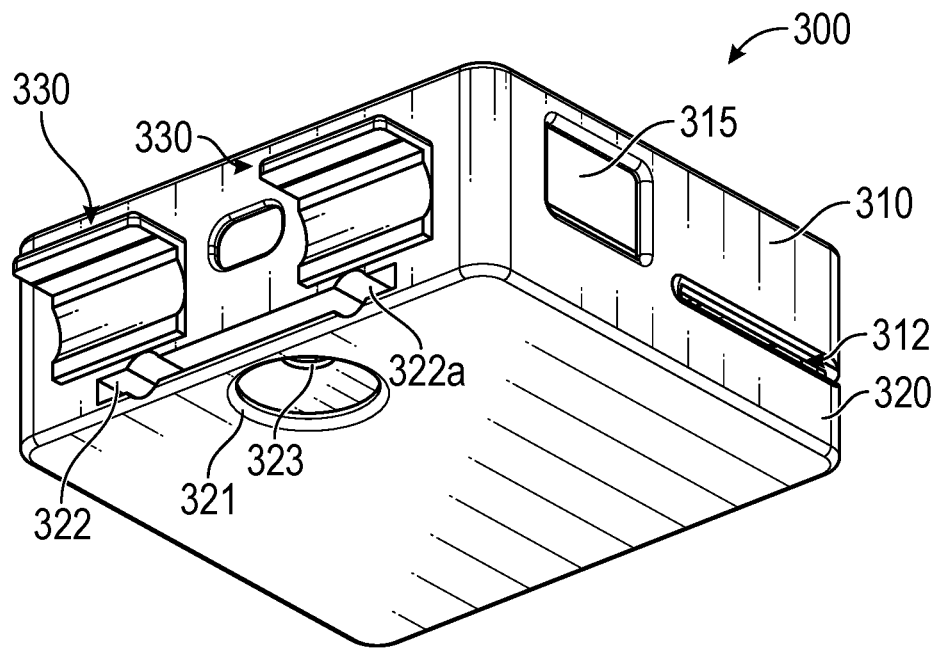
FIGS. 5A-5D are bottom perspective, top perspective, side and top views respectively of a card reader holding component of the universal card reader and mobile device holder of FIGS. 1A and 1B.
Figure 5B:
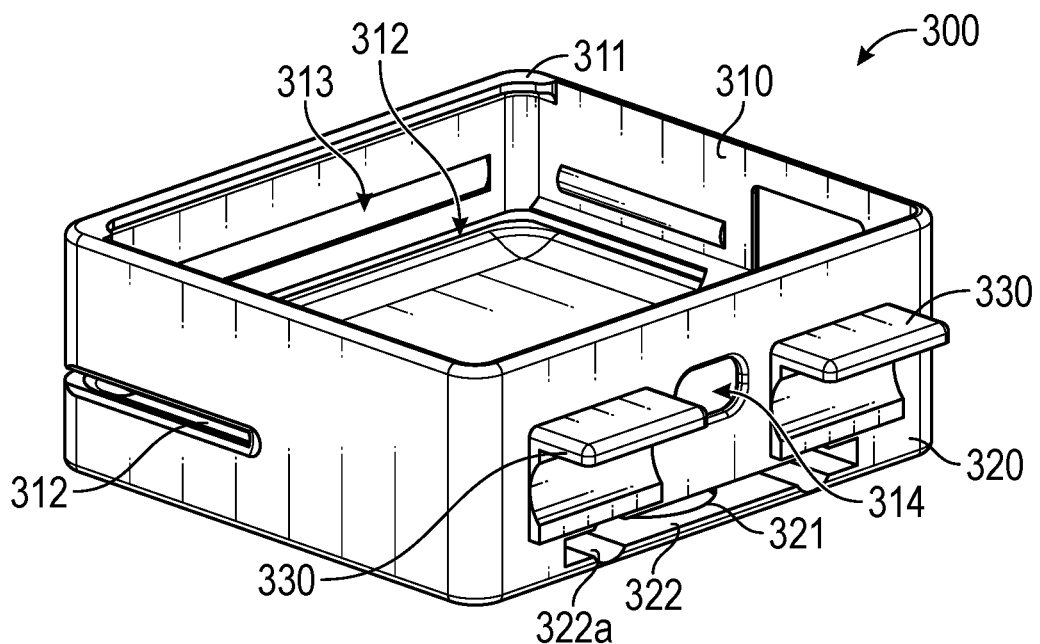
Figure 5C:
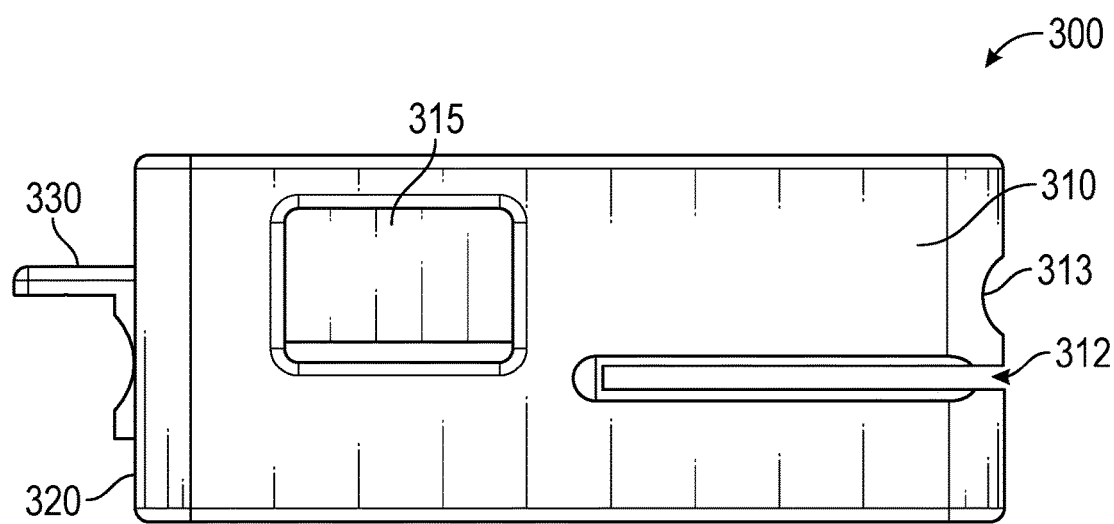
Figure 5D:
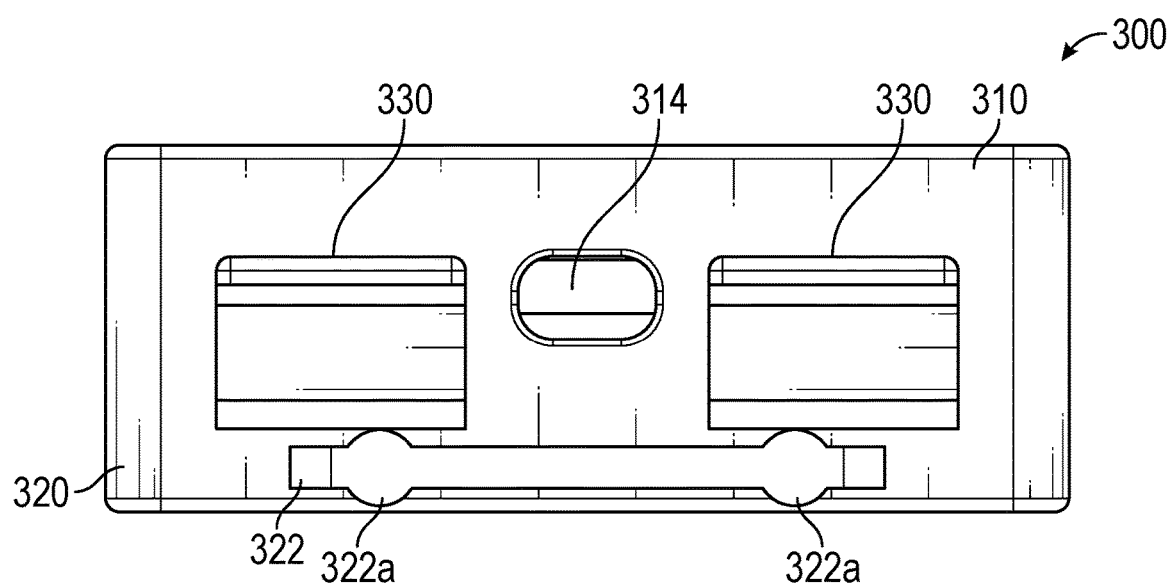
Figure 6A:
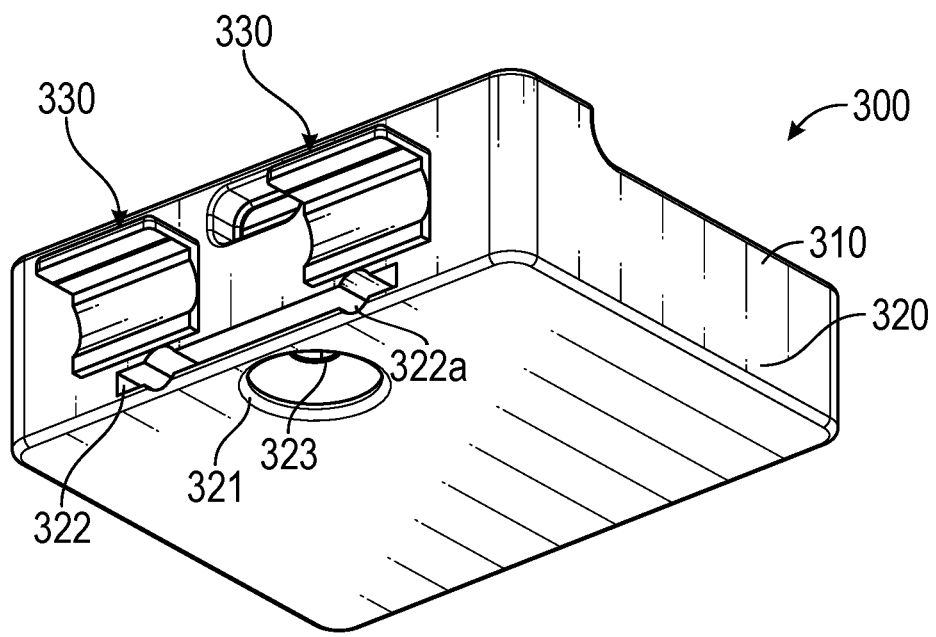
FIGS. 6A-6D are bottom perspective, top perspective, side and top views respectively of another card reader holding component that may be used with the universal card reader and mobile device holder of FIGS. 1A and 1B.
Figure 6B:
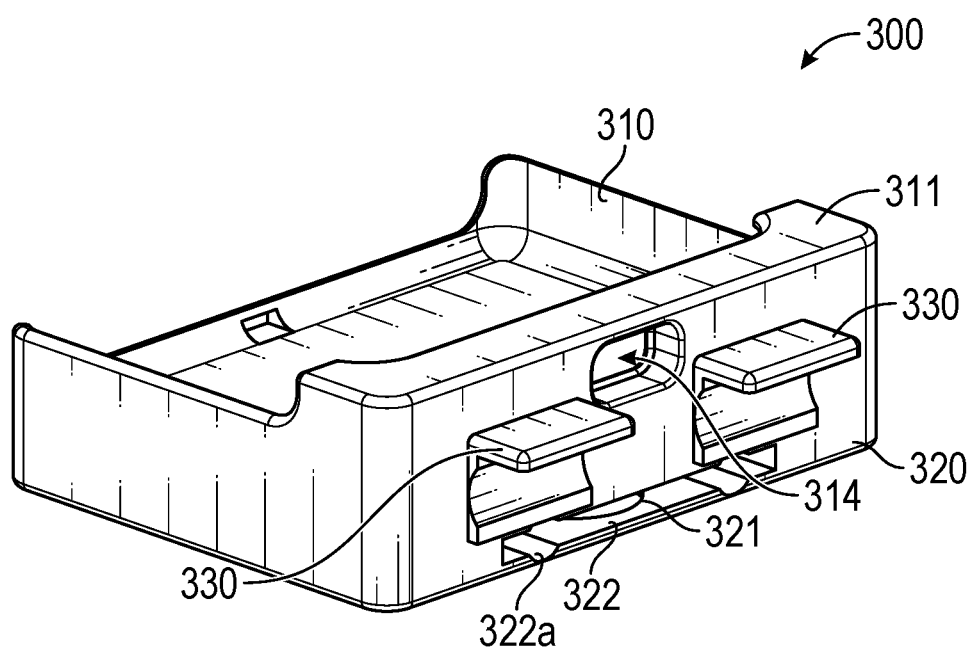
Figure 6C:
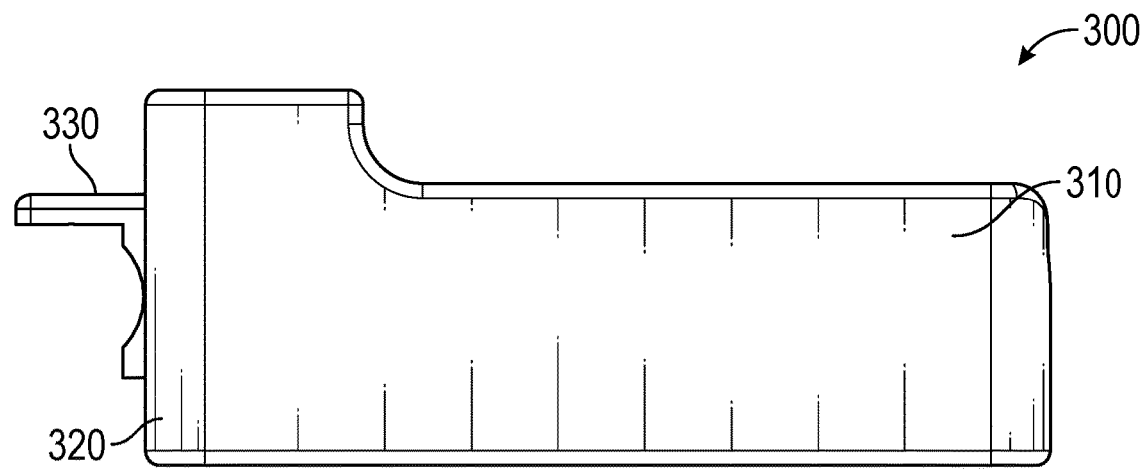
Figure 6D:
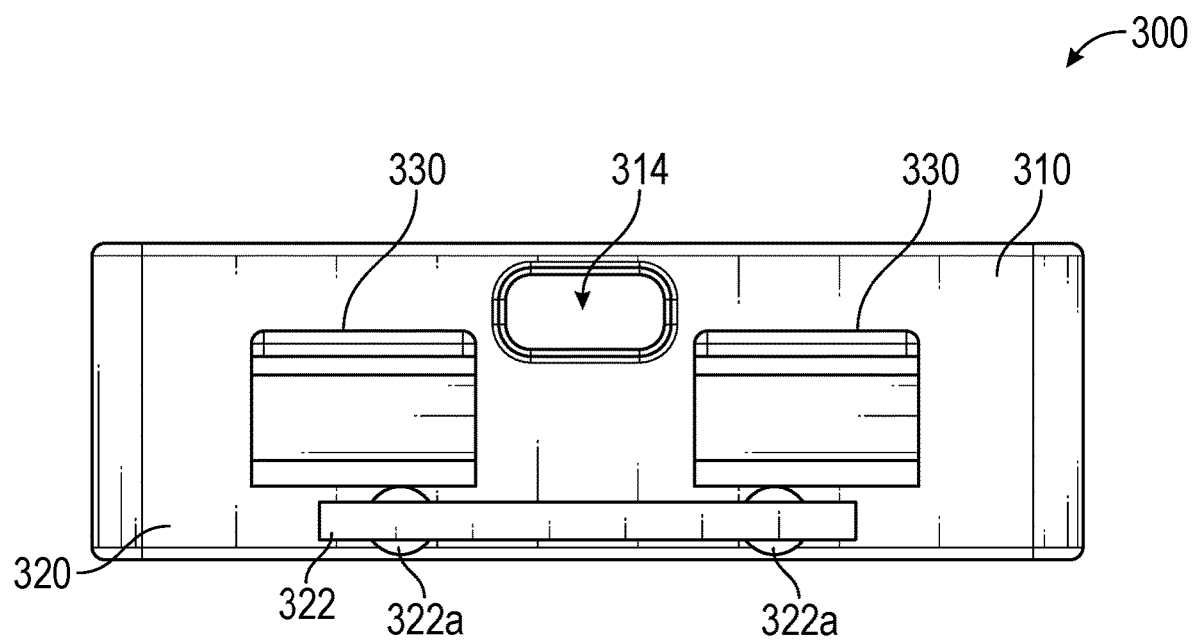

FIGS. 1A and 1B are assembled and exploded views of universal reader 10, and FIG. 2 provides an example of how a mobile device 400 and a card reader 500 can be held within universal reader 10. Universal reader 10 generally includes a mobile device holding component 100, an actuator mechanism 200, and a card reader holding component 300. FIGS. 3A-3C are views of mobile device holding component 100 in isolation. FIGS. 4A and 4B are views of portions of actuator mechanism 200 in isolation. FIGS. 5A-5D are views of card reader holding component 300 in isolation. FIGS. 6A-6D are views of another card reader holding component 300 which is configured for the Ingenico Moby 5500 card reader.

As an overview, mobile device holding component 100 can be configured to insert into and slide within a lower compartment 320 of card reader holding component 300 to thereby accommodate a variety of mobile devices. Actuator mechanism 200 can be coupled to card reader holding component 300 and configured to adjust and lock the position of mobile device holding component 100 relative to card reader holding component 300. Card reader holding component 300 can include a card reader compartment 310 that is configured to house a particular card reader.

As is best shown in FIGS. 3A-3C, mobile device holding component 100 can include a support 110 that may have an elongated shape with a length that general corresponds to the height of mobile devices with which universal holder 10 may be used. For example, the length of support 110 may be 136 mm in embodiments where universal holder 10 is intended to be used with iPhones or other common smart phones. However, support 110 could have any other suitable length such as a greater length for embodiments in which universal holder 10 may be used with tablets. In some embodiments, support 110 may include a recessed area 111 to accommodate one or more rear cameras on a mobile device.

Mobile device holding component 100 can also include an extension 120 that extends from one end of support 110. Extension may include a channel 121 within which linear gear 122 is formed. As described in detail below, linear gear 122 can function as the rack of a rack and pinion. In some embodiments, extension 120 may include ribs 123 to reinforce extension 120. Extension 120 can be configured to insert into lower compartment 320 to couple mobile device holding component 100 to card reader holding component 300.

Mobile device holding component 100 may further include a wall 112 that extends upwardly from support 110 on the opposite end from extension 120. A tab 113 may extend from wall 112 towards extension 120. Wall 112 and tab 113 may be configured to receive a bottom end of a mobile device. In some embodiments, wall 112 may have a thinned region 112 which allows wall 112 to flex to accommodate a thicker mobile device including mobile devices that may have a case. In some embodiments, wall 112 may include an opening 124 to provide access to the mobile device's charging port while the mobile device is held in mobile device holding component 100.

Actuator mechanism 200 can be configured to interface with linear gear 122 to cause mobile device holding component 100 to slide relative to card reader holding component 300. For example, in the depicted embodiment, actuator mechanism 200 includes an upper wheel 230 that includes a circular gear 234 that extends from its upper surface and functions as the pinion in the rack and pinion. In particular, circular gear 234 can extend into lower compartment 320 and be positioned within channel 121 so that, as upper wheel 230 is turned, mobile device holding component 100 will be slid into or out from lower compartment 320.

Actuator mechanism 200 can also include a lower wheel 220 that interfaces with upper wheel 230 to lock the position of mobile device holding component 100 relative to card reader holding component 300. For example, lower wheel 220 may include a protruding region 222 that inserts into a recessed region 232 of upper wheel 230. Lower wheel 220 and upper wheel 230 may also include radial ridges 221 and 231 respectively that interlock when lower wheel 220 is tightened against upper wheel 230. Accordingly, when lower wheel 220 is not sufficiently tightened against upper wheel 230, a user can freely rotate upper wheel 230 to slide mobile device holding component 100 to a desired position. Then, when mobile device holding component 100 is in the desired position (e.g., when a mobile device is held snuggly between wall 112 and card reader holding component 300), the user can tighten lower wheel 220 against upper wheel 230 to prevent upper wheel 230 from rotating, thereby locking the position of mobile device holding component 100.

To enable this tightening, lower wheel 220 and upper wheel 230 can be coupled to card reader holding component 300 via a bolt 240 and a nut 210. In particular, bolt 240 may extend down through and be held within an opening 323 in a wall that separates lower compartment 320 from card reader compartment 310. Bolt 240 can also extend through upper wheel 230 and lower wheel 220, and nut 210 can be threaded onto bolt 240 and held within an opening 224 in a lower surface of lower wheel 220. Therefore, when lower wheel 220 is turned in a tightening direction (e.g., clockwise), nut 210 will also be tightened onto bolt 240 thereby tightening lower wheel 220 against upper wheel 230. This tightening will cause ridges 221 and 231 to interlock to thereby hold upper wheel 230 in place. Accordingly, a mobile device can be held securely within mobile device holding component 100 until the user intentionally turns actuator mechanism 200.

With reference to FIGS. 5A-5D and FIGS. 6A-6D, card reader holding component 300 can form a card reader compartment 310 and a lower compartment 320. Card reader compartment 310 may be configured for a particular type of card reader and may therefore have different openings that correspond to the configuration of the particular type of card reader. Lower compartment 320 can be configured to receive extension 120 and actuator mechanism 200 as described above. For example, a slot 322 may be formed in the wall of lower compartment 320 that is oriented towards mobile device holding component 100. Slot 322 can be configured to receive extension 120 including having channels 322a for receiving ribs 123. An opening 231 may be formed in the bottom wall of lower compartment 320 and may be sized and shaped to receive circular gear 234. Card reader holding component 300 may also include tabs 331 that are positioned above slot 322 and extend outwardly overtop mobile device holding component 100. Tabs 331, like tabs 113, extend overtop a mobile device to secure the mobile device within mobile device holding component 100.

With reference to FIGS. 5A-5D, card reader holding component 300 can include a lip 311 that assists in securing card reader 500 within card reader compartment 310. Card reader compartment 310 can also include an opening 312 that aligns with an opening of card reader 500 for swiping a card, an opening 313 that aligns with an opening of card reader 500 for inserting a card, an opening 314 that aligns with a charging port of card reader 500, and an opening 315 that aligns with a power button of card reader 500. In contrast, with reference to FIGS. 6A-6D, card reader compartment 310 could include lip 311 and opening 314 that correspond with a different type of card reader.

In summary, a universal card reader and mobile device holder configured in accordance with embodiments of the present invention enables a variety of mobile devices to be combined with a variety of card readers to create a mobile point-of-sale system. By simply selecting the appropriate card reader holding component for use in the universal card reader and mobile device holder, the user can secure virtually any smart phone or other mobile device to a card reader in a quick and easy manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A universal card reader and mobile device holder comprising:
   a card reader holding component that is configured to hold a card reader;
   a mobile device holding component that is configured to move relative to the card reader holding component to accommodate a variety of mobile devices; and
   an actuator mechanism that is configured to move the mobile device holding component relative to the card reader holding component and lock a position of the mobile device holding component relative to the card reader holding component.

2. The universal card reader and mobile device holder of claim 1, wherein the card reader holding component includes a card reader compartment and a lower compartment, and wherein the mobile device holding component moves within the lower compartment.

3. The universal card reader and mobile device holder of claim 2, wherein the mobile device holding component includes a support and an extension, the extension inserting into the lower compartment.

4. The universal card reader and mobile device holder of claim 3, wherein the extension includes a channel, and wherein the actuator mechanism inserts into the channel.

5. The universal card reader and mobile device holder of claim 4, wherein the channel forms a rack and the actuator mechanism forms a pinion.

6. The universal card reader and mobile device holder of claim 5, wherein the actuator mechanism comprises an upper wheel that forms the pinion and a lower wheel.

7. The universal card reader and mobile device holder of claim 6, wherein the lower wheel interfaces with the upper wheel to lock the position of the mobile device holding component relative to the card reader holding component.

8. The universal card reader and mobile device holder of claim 7, wherein the upper wheel and lower wheel include radial ridges that interlock.

9. The universal card reader and mobile device holder of claim 7, wherein the lower wheel tightens against the upper wheel to lock the position of the mobile device holding component relative to the card reader holding component.

10. The universal card reader and mobile device holder of claim 1, wherein the card reader holding component includes one or more tabs that extend over one end of a mobile device and the card reader holding component includes one or more tabs that extend over an opposite end of the mobile device.

11. The universal card reader and mobile device holder of claim 6, wherein the card reader holding component includes a lower compartment into which the mobile device holding component inserts, and wherein the one or more tabs of the card reader holding component are positioned above the lower compartment.

12. The universal card reader and mobile device holder of claim 11, wherein the mobile device holding component comprises a rack and the actuator mechanism comprises a pinion.

13. A universal card reader and mobile device holder comprising:
    a card reader holding component having a card reader compartment and a lower compartment;
    a mobile device holding component having a support and an extension, the extension inserting into the lower compartment; and
    an actuator mechanism that inserts into the lower compartment and interfaces with the extension to cause the mobile device holding component to slide relative to the card reader holding component.

14. The universal card reader and mobile device holder of claim 13, wherein the extension forms a channel and the actuator mechanism inserts into the channel.

15. The universal card reader and mobile device holder of claim 14, wherein the channel forms a rack and the actuator mechanism forms a pinion.

16. The universal card reader and mobile device holder of claim 15, wherein the actuator mechanism comprises an upper wheel that forms the pinion, the actuator mechanism further comprising a lower wheel that interlocks with the upper wheel to retain a position of the mobile device holding component.

17. A universal card reader and mobile device holder comprising:
   a card reader holding component having a card reader compartment and a lower compartment;
   a mobile device holding component having a support and an extension, wherein the extension includes a channel forming a first gear and the extension inserts into the lower compartment; and
   an actuator mechanism comprising an upper wheel that forms a second gear that inserts into the lower compartment and through the channel, the first and second gears interfacing to cause the mobile device holding component to move relative to the card reader holding component.

18. The universal card reader and mobile device holder of claim 17, wherein the actuator mechanism comprises a lower wheel that interlocks with the upper wheel to retain a position of the mobile device holding component to move relative to the card reader holding component.

19. The universal card reader and mobile device holder of claim 18, wherein the lower wheel tightens against the upper wheel to interlock with the upper wheel.

20. The universal card reader and mobile device holder of claim 17, wherein the mobile device holding component includes one or more tabs for securing one end of a mobile device, and the card reader holding component includes one or more tabs for securing an opposite end of the mobile device.

* * * * *